United States Patent
Roussel et al.

(10) Patent No.: US 12,017,153 B2
(45) Date of Patent: Jun. 25, 2024

(54) LIQUID-LIQUID EXTRACTOR AND BATTERY COMPRISING SUCH EXTRACTORS

(71) Applicant: COMMISSARIAT À L'ÉNERGIE ATOMIQUE ET AUX ÉNERGIES ALTERNATIVES, Paris (FR)

(72) Inventors: Hervé Roussel, Laudun (FR); Frank Dutilh, Laudun (FR)

(73) Assignee: COMMISSARIAT À L'ÉNERGIE ATOMIQUE ET AUX ÉNERGIES ALTERNATIVES, Paris (FR)

(*) Notice: Subject to any disclaimer, the term of this patent is extended or adjusted under 35 U.S.C. 154(b) by 9 days.

(21) Appl. No.: 17/486,122

(22) Filed: Sep. 27, 2021

(65) Prior Publication Data

US 2022/0105447 A1 Apr. 7, 2022

(30) Foreign Application Priority Data

Oct. 2, 2020 (FR) ........................................ 2010084

(51) Int. Cl.
*B01D 11/04* (2006.01)
*B01D 11/00* (2006.01)

(52) U.S. Cl.
CPC ...... *B01D 11/0492* (2013.01); *B01D 11/0453* (2013.01); *B01D 2011/002* (2013.01)

(58) Field of Classification Search
None
See application file for complete search history.

(56) References Cited

U.S. PATENT DOCUMENTS

| | | | |
|---|---|---|---|
| 2,791,537 A * | 5/1957 | Felix | B01D 11/043 210/301 |
| 3,162,510 A | 12/1964 | Meissner et al. | |
| 3,692,494 A * | 9/1972 | Bathellier et al. | B01D 17/0208 422/259 |
| 4,268,484 A * | 5/1981 | Gavin | B01D 11/04 422/259 |

(Continued)

FOREIGN PATENT DOCUMENTS

| | | |
|---|---|---|
| CN | 108751135 A | 11/2018 |
| CN | 110038319 A | 7/2019 |

(Continued)

OTHER PUBLICATIONS

Weeranoppanant, et. al, Design of Multistage Counter-Current Liquid-Liquid Extraction for Small-Scale Applications, Industrial & Engineering Chemistry Research 2017 56 (14), 4095-4103 (Year: 2017).*

(Continued)

*Primary Examiner* — Bradley R Spies
*Assistant Examiner* — Jeannie McDermott
(74) *Attorney, Agent, or Firm* — Pearne & Gordon LLP

(57) ABSTRACT

These liquid-liquid extractors are adapted to very low fluid flow rates passing through them. In order to reduce the influence of capillarity and air phenomena that may make the flow irregular, the outlet ducts comprise, downstream of the settling cell where the heavy and light phases separate, overflows of the phases the edge of which is irregular in height, for example serrated. The circulation channels of the phases are advantageously open to also reduce the risks of blocking by air bubbles.

19 Claims, 5 Drawing Sheets

(56) References Cited

U.S. PATENT DOCUMENTS

| | | | | | |
|---|---|---|---|---|---|
| 4,404,173 | A | * | 9/1983 | Bailey | B01D 11/0457 210/207 |
| 4,954,260 | A | * | 9/1990 | Ludmer | B01D 11/0484 210/511 |
| 5,050,997 | A | * | 9/1991 | Sklokin | B01D 11/0473 366/292 |
| 5,254,244 | A | * | 10/1993 | Chomel | B01D 11/0457 422/50 |
| 2004/0097756 | A1 | * | 5/2004 | Thiel | B01J 8/0492 261/114.1 |
| 2004/0241062 | A1 | * | 12/2004 | Rivalier | B01D 11/0457 422/258 |

FOREIGN PATENT DOCUMENTS

| | | | |
|---|---|---|---|
| EP | 0531213 | A1 | 3/1993 |
| FR | 1580163 | A | 9/1969 |
| FR | 2459064 | A1 | 1/1981 |
| FR | 2831075 | A1 | 4/2003 |

OTHER PUBLICATIONS

Search Report for French application No. 2010084 dated Jun. 22, 2021.

* cited by examiner

LIQUID-LIQUID EXTRACTOR AND BATTERY COMPRISING SUCH EXTRACTORS

CROSS-REFERENCE TO RELATED APPLICATIONS

This application claims priority from French Patent Application No. 2010084 filed on Oct. 2, 2020. The content of this application is incorporated herein by reference in its entirety.

BACKGROUND OF THE INVENTION

The invention is in the field of chemical engineering and more particularly relates to liquid-liquid extractors, as well as to a battery comprising such extractors.

These extractors are intended to carry out transfers of solutes between two immiscible phases, commonly called aqueous phase and solvent or organic phase, or heavy phase and light phase. They belong to the family of mixers-settlers. The two liquid phases are mixed by creating an emulsion, then separated by settling, which makes it possible for the solute initially contained in one of the liquids to be transferred to the second. It frequently happens that a battery of a plurality of stages each comprising such an extractor is used, in order to obtain a better extraction in a method where the phases pass successively through each of them. The extractors generally comprise a mixer compartment in which the emulsion is formed by the movement of a moveable body, and a settler compartment in which the liquid phases are separated. The circulation of the phases in these batteries is generally countercurrent.

Liquid-liquid extractors of various sizes are proposed, from large industrial apparatuses capable of containing a plurality of tens of cubic metres per stage, to small-volume apparatuses, the extractors of which may each contain a few hundreds of millimetres per stage.

Extractors with very small capacity and very low extraction flow rate have been designed for applications in the field of nuclear fuel. The very reduced flow rates may be a few tens to a few hundreds of millimetres per hour. An example of extractor of this kind is described in the document FR 1580163 A. A battery of extractors adapted to such applications, and making it possible to be mounted and modified easily by remote manipulation, is described in the document FR 2831075 A.

Other extractors are particularly disclosed by the documents EP 0531213 A1 and FR 2459064 A1.

BRIEF SUMMARY

A specific problem with low flow rates is that the capillarity forces may make the flows of the liquid phases irregular, with variations, that may be unacceptable, of the levels of the phases or of their mixing in the compartments. Another frequent problem encountered is the difficulty to modify a battery of extractors in a hostile environment, nuclear for example, or to dismantle and adjust the individual extractors, which are often specifically of small size for low flow rates, by remote manipulation means or through a glove box.

The invention firstly relates to an improved liquid-liquid extractor, that may be of very reduced size, and provided with various improvements ensuring particularly a good flow regularity, even at very low flow rates, a facilitated settling and various items of equipment that are easy to install on the fixed structure of the extractor by remote manipulation if this is necessary. Another aspect of the invention is a battery comprising such extractors and designed in such a way as to be able to be used easily in a nuclear environment, that is to say in a glove box or in shielded chain, thanks to a great ease of mounting and assembling by remote manipulation.

In a general form, the invention relates to a liquid-liquid extractor comprising a block hollowed with mixing and settling cells in communication, inlet ducts of the two liquid phases leading to the mixing cell and outlet ducts of the two liquid phases connected to the settling cell, characterised in that the outlet ducts are equipped with overflows adjacent to the settling cell, and each provided with an overflow edge of the liquid phases having an irregular height in the form of a broken line delimiting a plurality of reliefs.

The overflows or spillways are obstacles to flows of the liquid phases, which define the heights above which the flow starts. The overflows that are discussed here are placed at the outlets of the settling cell, at different heights, in such a way as to adjust the height of each of the phases at this location. A broken line herein will refer to a line typically delimiting a plurality of reliefs alternately protruding and recessing by having a slope the evolution of which is irregular, with a plurality of inversions of directions, along the line. In the case of a very low flow rate, the flow subsists through the bottoms of the recessing reliefs, thanks to their narrowness, by therefore avoiding significant effects of capillarity forces and liquid retentions upstream of the overflows. Such an effect does not exist on a straight overflow, or a horizontal flow surface or surface with low slope, or even at the bottom of a gutter of circular section of which the radius of curvature would be much greater than the reliefs envisaged here.

According to a preferred form, the overflow edge of one at least of the overflows consists of a plurality of indentations narrowing downwardly up to a zero width and formed by two oblique edges.

According to another form, for that matter compatible with the preceding one, the overflow edge of one at least of the overflows is serrated, consisting of alternate identical and uniformly distributed reliefs.

In a particular embodiment of the invention, one of the overflows is placed at a junction between the settling cell and the outlet duct of one of said liquid phases known as light phase; it defines the total height of the phases in the settling cell.

According to yet another embodiment, compatible with the preceding one, another of the overflows may be placed in an inlet well of the outlet duct of another of the liquid phases known as heavy phase, at a height that can be adjusted in the inlet well in order to adjust the relative retention time of the two liquid phases in the extractor.

According to an optional but important improvement, the outlet ducts mainly or essentially consist of channels open at an upper face of the block forming the structure of the extractor. The effect of this construction of open output channels is however similar to that of reliefs of overflows: the capillarity effects, the flow retentions at low flow rates and also air bubble trappings are reduced, and a better regularity of the flow is therefore also obtained.

These open channels, which are the seat of gravity flows of liquid phases, may advantageously extend in a straight line, for example parallel to lateral faces of the block where the outlet ducts open; they may be without disadvantage fairly long and extend for example over at least half of a length of the block, measured parallel to the lateral faces. The flows remain easy and regular, and the extractor block remains compact. This arrangement is useful in order to obtain an extractor where the inlet and outlet openings of each of the liquid phases are aligned according to two lines perpendicular to the lateral faces. Its interest manifests in batteries comprising a plurality of stages assembled by the lateral faces: the extractors then all have the same orientation, with their similar equipment aligned according to parallel lines, which facilitates the manipulations on the battery, improves its appearance and makes overall examinations of the settling possible, for all of the stages of the battery, at a glance, if the settling cells are all turned towards an observer and exposed for view, for example through a porthole or another transparent wall.

The outlet channels are also advantageously fairly wide, optionally each with a width equal to at least one third of a width, measured perpendicular to the lateral faces, of the settling cell, also in order to make it possible to regulate the gravity flow at these locations.

The extractor may comprise a third overflow, disposed between the mixing cell and the settling cell, and provided, in a similar manner as the preceding ones and with the same effect, with an overflow edge of the liquid phases having an irregular height in the form of a broken line delimiting a plurality of reliefs.

According to other possible optional improvements:
the extractor comprises a drawdown plate plunging into the settling cell and continuous up to a guard distance with a bottom of the settling cell;
it comprises settling equipment that can be plugged into the settling cell by translation and comprising a coalescence grid of the previously formed emulsion, plunging into the settling cell and promoting the coalescence of one of the liquid phases;
this settling equipment comprises a second coalescence grid promoting the coalescence of the other of the liquid phases;
the block includes a console on an upper face of which a recirculation pump may be installed, the recirculation pump being provided with vertical suction and discharge tubes respectively plunging into the outlet duct of one of the liquid phases and into a suction chamber, hollowed into the block and communicating with the mixing cell.

Another aspect of the invention is a liquid-liquid extraction battery comprising at least one extractor in accordance with the foregoing; the extractor or the extractors and end modules are aligned and tightened on a rail, the end modules comprising connections to countercurrent liquid phase circuits in the battery, the inlets and outlets of each of the phases being in extension between the extractors.

The battery may advantageously comprise dividing plates tightened against the extractors and carrying seals surrounding the inlet and outlet openings of the liquid phases, in such a way as to also facilitate the mounting of the device.

The liquid-liquid extractors, the end modules, and optionally the dividing plates, may be interlocked on the rail by being able to slide along it, also in order to facilitate the mounting.

Another improvement that may be envisaged is to provide the battery with heating means. These means may be established inside the rail or below it, and consist of a heater mat, for example by electrical resistance. Another device may comprise a device for circulating coolant passing through the block of each of the extractors of the battery.

BRIEF DESCRIPTION OF THE DRAWINGS

The various aspects, features and advantages of the invention will now be described in greater detail by means of the following figures, which thereby illustrate certain purely illustrative embodiments.

DETAILED DESCRIPTION

Figure 1:
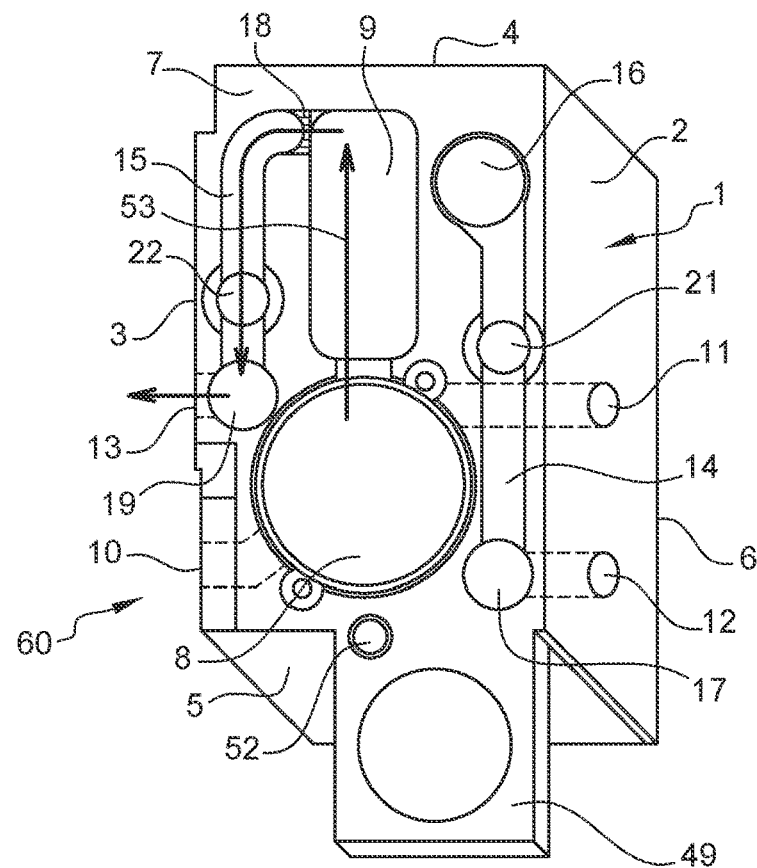
FIG. 1 a top view of an extractor.

Firstly, an individual liquid-liquid extractor 60 will be described, illustrated from FIG. 1. It consists of a block 1 generally parallelepiped almost regular and limited by two long vertical faces that are a first lateral face 2 and a second lateral face 3 parallel to the preceding one, by two short vertical faces, of which a front face 4 and a rear face 5 perpendicular to the preceding ones, and by a bottom face 6 and an upper face 7 perpendicular to all of the preceding ones. The block 1 is hollowed with cells of which a mixing cell 8, a settling cell 9, and also a heavy phase inlet duct 10, a light phase inlet duct 11, a heavy phase outlet duct 12 and a light phase outlet duct 13. The inlet ducts 10 and 11 of the heavy phase and of the light phase end at the mixing cell 8, respectively from the second lateral face 3 and from the first lateral face 2, and the outlet ducts 12 and 13 of the heavy phase and of the light phase start from the settling cell 9 and end respectively at the first lateral face 2 and at the second lateral face 3. The openings of the inlet and outlet ducts of the heavy phase 10 and 12 on the lateral faces 2 and 3 are in alignment in the direction perpendicular to these lateral faces 2 and 3, and the openings of the inlet and outlet ducts 11 and 13 of the light phase are likewise in alignment in this direction.

It is therefore possible to obtain batteries consisting of a plurality of successively coupled stages, each comprising one of these extractors 60, wherein it forms single heavy phase and light phase ducts successively passing through all of the mixing cells 8 and settling cells 9 and following countercurrent paths through the extractors 60. Such a battery will be described further. The passage through a plurality of extractors 60 is applied to produce a more enhanced extraction of the solute.

The outlet ducts 12 and 13 of the heavy phase and of the light phase mainly comprise portions parallel to the lateral faces 2 and 3, respectively called heavy phase outlet channel 14 and light phase outlet channel 15; the heavy phase output channel 14 is adjacent to the first lateral face 2 and extends from an inlet well 16 to an outlet well 17, the first of which is adjacent to the settling cell 9 and to the front face 4, over a little more than half of the length of the extractor between the front face 4 and the rear face 5. The light phase outlet channel 15 communicates with the settling cell 9 by a light phase overflow 18 and extends up to an outlet well 19 by being adjacent to the second lateral face 3 over approximately half of said length of the extractor 60. The mixing cell 8, the settling cell 9 and the largest portion of the outlet ducts 12 and 13, of which particularly the outlet channels 14 and 15, open out of the extractor 60 by leading to its upper face 7. This arrangement makes it possible to reduce the influence of capillarity phenomena and the trapping of air bubbles that may block the outflow, even at very low flow rates.

Figure 6:
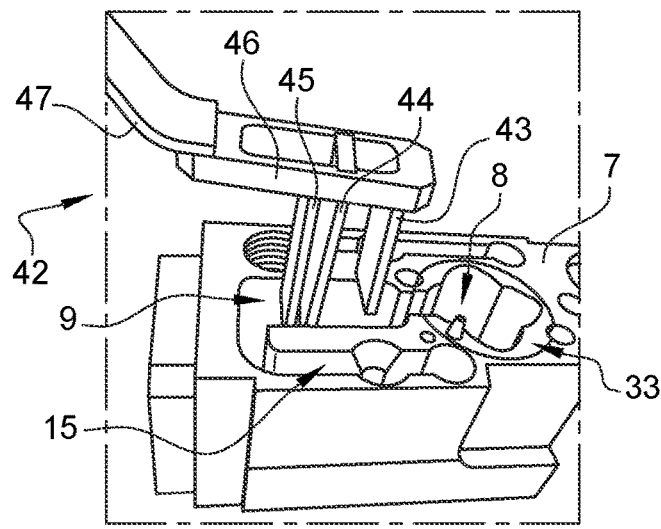
FIG. 6 the equipment facilitating the settling.

The front face 4 is partially transparent and equipped with a porthole 20 (illustrated in FIGS. 2, 6 and 9) that makes it possible to observe, for each extractor 60 of a battery, the sequence of the settling and of the evacuation of the phases: indeed the porthole 20 partially delimits the settling cell 9 and the inlet of the light phase outlet duct 13. Alternatively, the whole block 1 may be transparent.

The heavy phase and light phase outlet channels 14 and 15 are provided with intermediate wells 21 and 22 that are able to receive spectrophotometric probes for the online analysis of the composition of the phases. The flow movement of the light phase is shown by the arrows 53.

Figure 2:
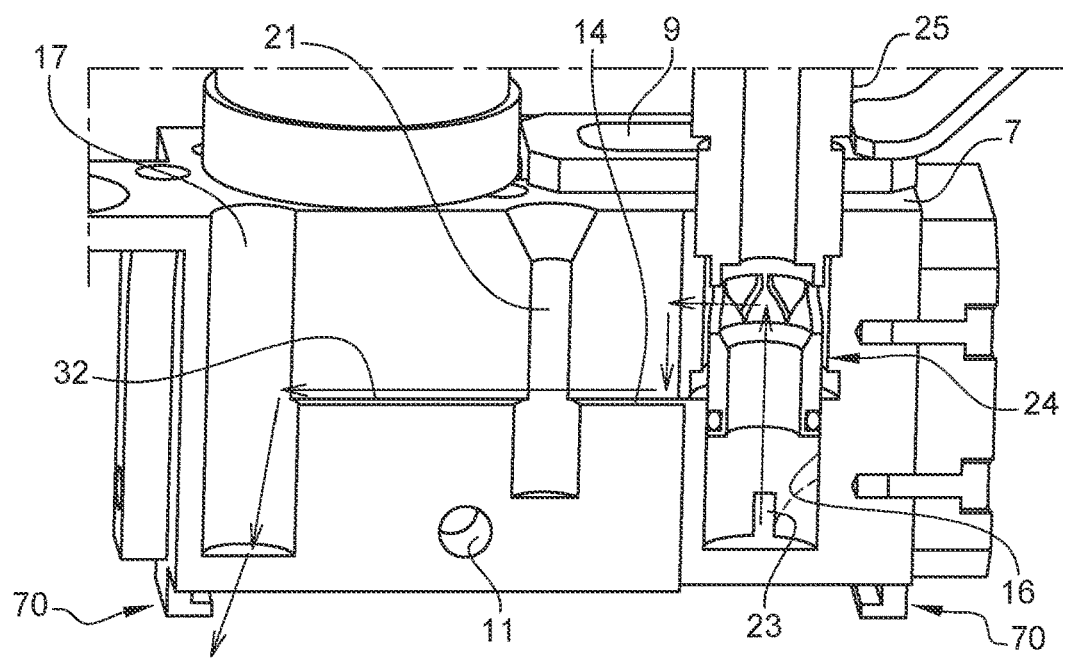
FIG. 2 a longitudinal section through the outlet duct of the heavy phase.
Figure 3:
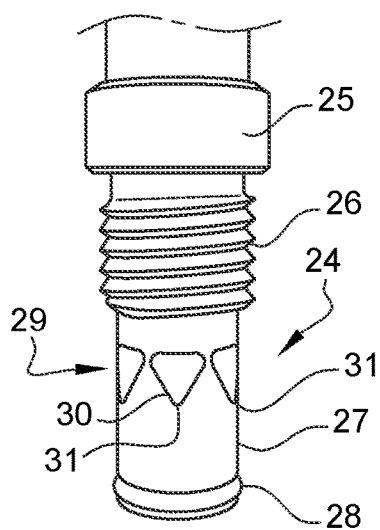
FIG. 3 a heavy phase adjustable overflow.

FIGS. 2 and 3 further illustrate the heavy phase outlet duct 12. The inlet well 16 includes a lower opening 23 that communicates at the bottom of the settling cell 9: the heavy phase accumulates in the inlet well 16 during the method and finishes by reaching a heavy phase overflow 24 that is a separate part, shown in detail in FIG. 3. The heavy phase overflow 24 is generally cylindrical and comprises from top to bottom a gripping handle 25, a threading 26 and a socket 27. The handle 25 protrudes on the extractor above the upper face 7, the threading 26 is engaged in a tapping corresponding to the top of the inlet well 16, and the socket 27 extends into the latter with a clearance, with the exception of its lower portion, which is equipped with an O-ring seal 28 rubbing against the inlet well 16 above the lower opening 23 and below a connection to the heavy phase output channel 14.

An upper portion of the socket 27, above the seal 28, is equipped with triangular cutouts 29 distributed around its periphery and delimited by a lower sawtooth edge 30, in such a way that the triangular cutouts 29 each have a lower tip 31 forming an acute angle. The lower tips 31 extend in front of the connection to the heavy phase output channel 14, and the heavy phase discharges into this channel, once that it has reached the level of the triangular cutouts 29. It may then flow into the heavy phase output channel 14, before reaching the outlet well 17 and leaving the extractor 60. The flow movement of the heavy phase is shown by the arrows 32.

The construction of the extractor 60 from a single and hollowed block 1 makes it possible to add miscellaneous equipment thereto by mounting them via the upper face 7, by screwing such as with the heavy phase overflow 24, or by simple plugging-in by vertical translation, such as the equipment that will now be described. The adjustments and the manipulations on the extractors 60, as well as their assembling in batteries, are considerably facilitated and may be accomplished by remote manipulation apparatuses or through glove boxes.

Figure 4:
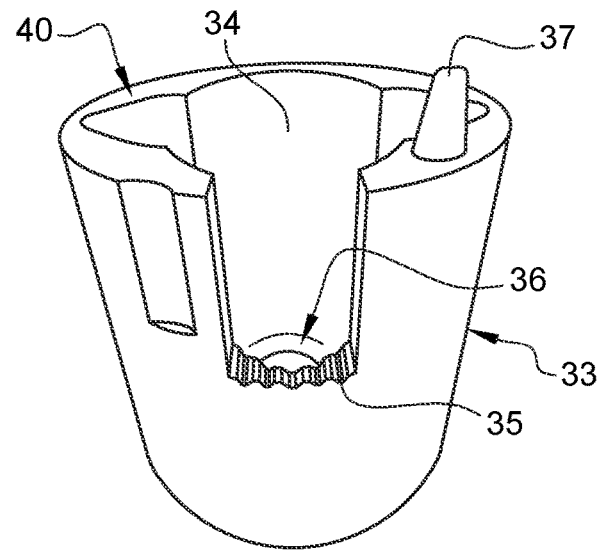
FIG. 4 a chamber for mixing the phases.

FIG. 4 shows a mixing chamber 33 that is sunk into the mixing cell 8 with a narrow clearance. It is a hollow part, approximately cylindrical, open upwardly and equipped at one side with an upper notch 34 the lower edge of which is a mixing overflow 35, with a lower opening 36 at the bottom, and with a vertical pin 37 rising vertically at its upper face. When the mixing chamber 33 is mounted, the upper notch 34 and the mixing overflow 35 extend in front of the upper portion of the settling cell 9 and define the level above which the mixture present in the chamber 33 may flow into the settling cell 9. The mixing overflow 35 has a serrated or crenelated shape, its upper edge through which the mixture flows towards the settling cell being in broken line shape forming alternately small protruding and recessing reliefs. The height of this upper edge is therefore variable. In addition, the recessing reliefs advantageously narrow downwardly, which is verified if the reliefs are separated by oblique faces. In the extreme, it may be envisaged that the oblique faces join together in a square angle, to give to the bottom of the recessing reliefs a zero width. These arrangements have the effect of regulating the flow even at very low flow rates despite the capillarity forces that may produce liquid retentions accumulating temporarily as droplets or by slightly overhanging the overflow, and splutters of the flow; the construction proposed here of the mixing overflow delimited by a broken line forming a plurality of reliefs ensures that a low or minimum flow width is offered to the low flow liquid if it is barely level above the overflow, which reduces the effect of the capillarity forces and tends to maintain a permanent flow.

A similar arrangement with broken-line overflow edge, with the same aim, characterised the heavy phase overflow 24, and also characterises the light phase overflow 18 that will be described completely further. In addition the open construction of the outlet channels 14 and 15, also has the same aim of reducing the effect of capillarity forces and regulating flows.

Figure 5:
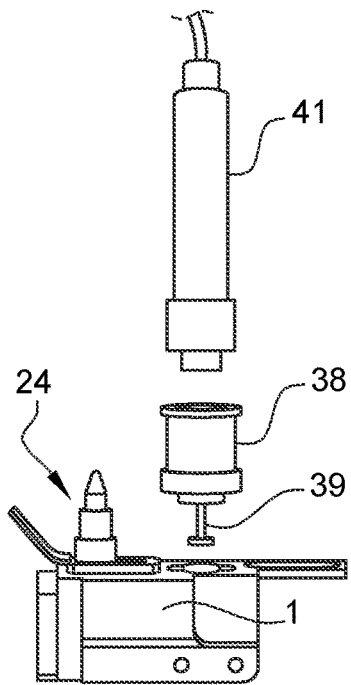
FIG. 5 the equipment for emulsifying the mixture.

FIG. 5 illustrates a bearing block 38 supporting a stirring device 39 with vertical blades, which may be placed on the upper edge 40 of the mixing chamber 33 at a fixed angular position, thanks to a vertical pin 37; and a motor 41 that may be placed on the upper edge of the bearing block 38, in such a way as to rotate the stirring device 39, when it is switched on, the stirring device 39 penetrating into the mixing chamber 33 at this moment to mix the liquid phases and create an emulsion.

Two other items of equipment may also be installed in the extractor by plugging in from the upper face 7. The first is engaged in the settling cell 9, bears the general reference 42 (FIG. 6) and may comprise a drawdown plate 43, as well as two coalescence grids 44 and 45, all connected to an upper plate 46. In the state shown, the drawdown plate 43 is vertical and adjacent to the mixing cell 8; its function is to force the mixture to enter into the settling cell 9 through the middle. The coalescence grids 44 and 45 are, as their name indicates, intended to promote the coalescence of that of the phases that is in emulsion in the other, therefore by providing a heavy phase and a light phase clearly separated and superposed in the settling cell 9. One of the coalescence grids 44 may be hydrophobic and the other hydrophilic, so as to promote the coalescence of the organic phase (in general the light phase) as well as that of the aqueous phase (in general the heavy phase) according to the category of the emulsion. Alternatively, two similar coalescence grids could be used, for phases in emulsions difficult to reconstitute. The coalescence grids 44 and 45 are also vertical, parallel to the drawdown plate 43 and extend towards the middle of the settling cell 9 in any order. A pull tab 47 rising upwards and attached to the upper plate 46 is added to make it possible to manipulate the equipment.

Figure 7:
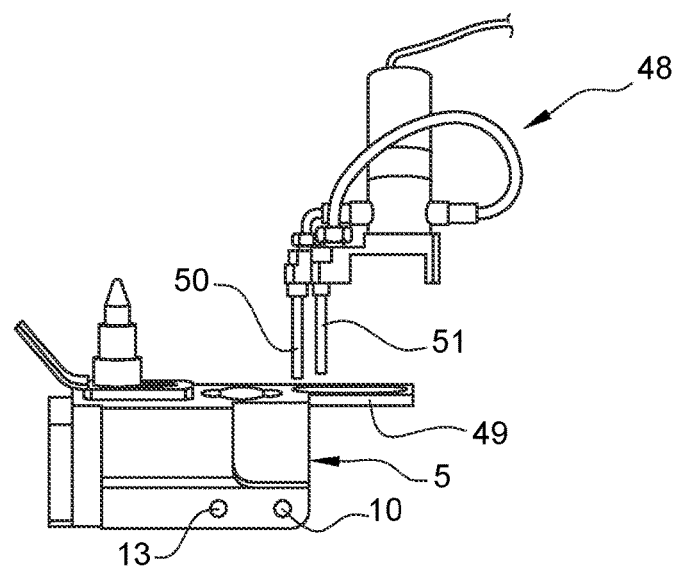
FIG. 7 recirculation equipment.

Another removeable item of equipment is shown in FIG. 7 and consists of a recycling pump 48 useful in certain methods and that is used to produce a partial return of one of the phases, here the heavy phase, towards the mixing cell 8. The recycling pump 48 is installed on a horizontal console 49 attached to the rear face 5 of the block 1 and exceeding rearwards (by concern for clarity, it is however shown here the recycling pump 48 raised above the console 49). It is equipped with a vertical suction tube 50 and a vertical discharge tube 51, able to penetrate respectively into the outlet well 17 of the heavy phase to suck therein a flow rate and into a vertical recycling well 52 hollowed into the block 1 close to the mixing cell 8. The recycling well 52, in the same way as the inlet ducts 10 and 11 of the heavy phase and of the light phase, lead into the mixing cell 8 and the liquids that follow them subsequently enter into the mixing chamber 34 via the lower opening 36.

Figure 8:
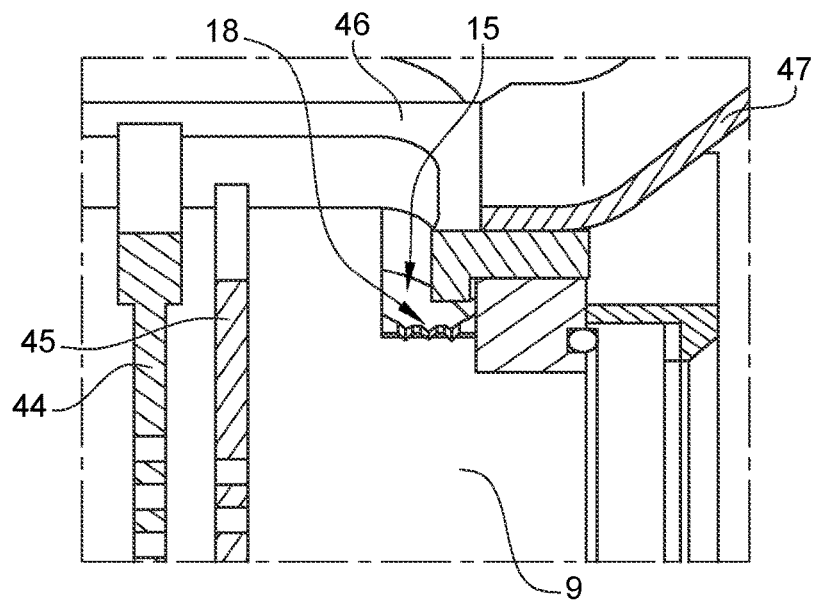
FIG. 8 the light phase overflow.

FIG. 8 shows that the outlet channel of the light phase 15 is at a different level in relation to the light phase overflow 18. The light phase overflow here is also materialised by an overflow edge crossed by the flow of the liquid and formed by a broken line, here forming horizontal bottom portions and oblique portions, and thus flat-top protruding reliefs alternating with triangular indentations tapering downwardly.

Another aspect of the invention will now be described by using the last FIGS. 9 to 13 of this description: the assembly of extractors 60 described so far to form an extraction battery.

Figure 9:
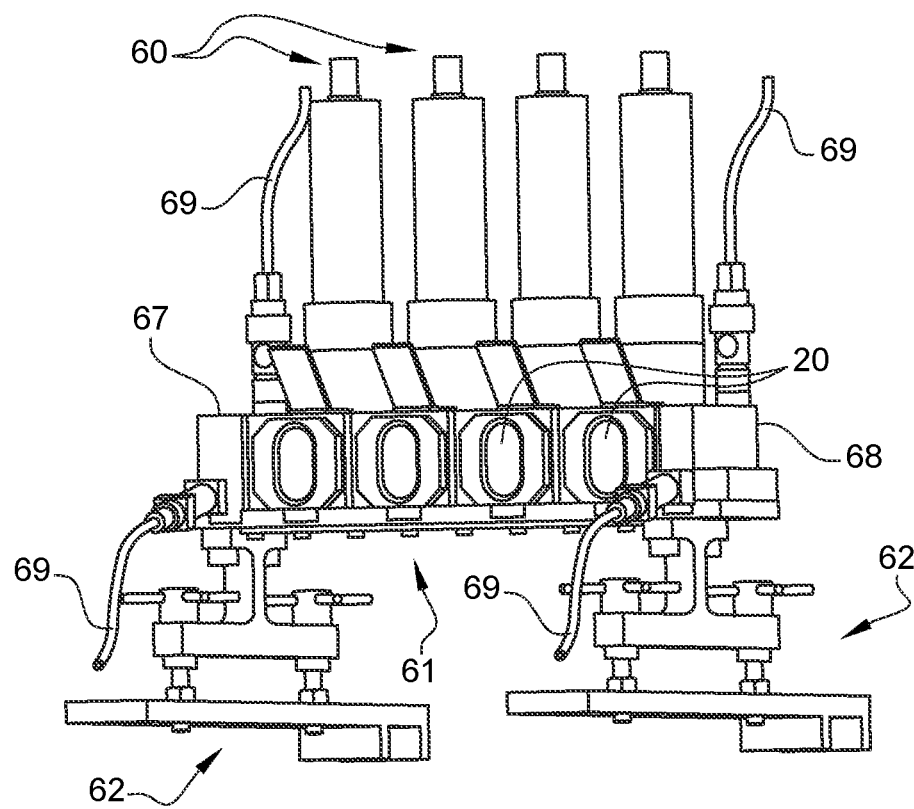
FIG. 9 a battery with a plurality of extractor stages.
Figure 11:
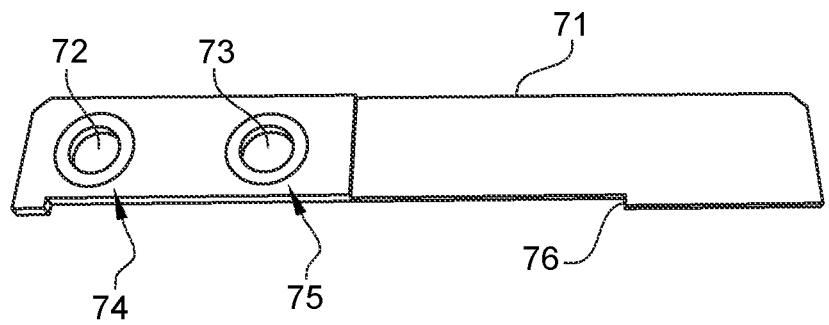
FIG. 11 a sealing plate between extractors.
Figure 12:
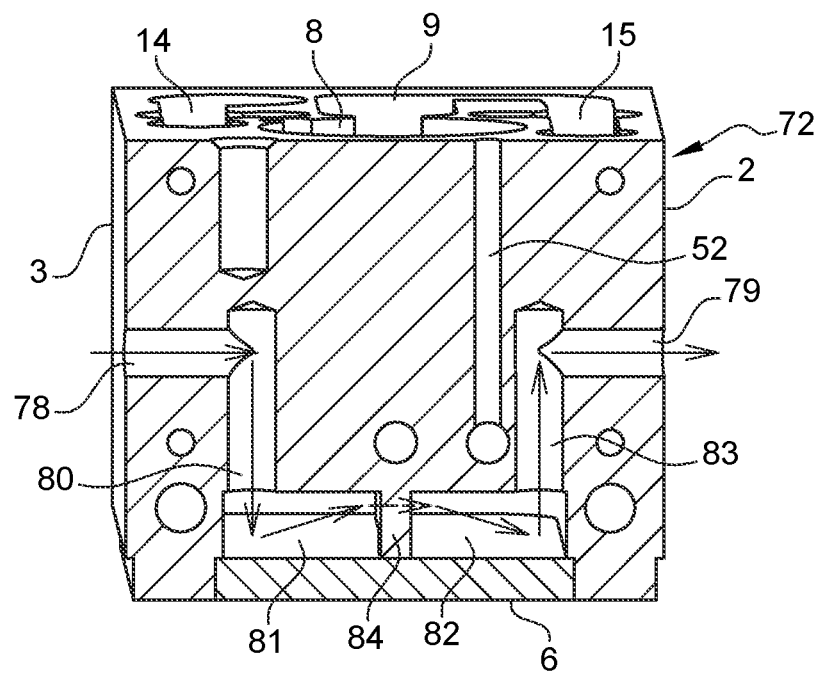
FIG. 12 an embodiment of coolant extractor.

Such a battery is shown in FIG. 9. The extractors 60 are disposed side by side on a flat support rail 61 the ends of which are installed on supports 62. It will be noted that the portholes 20 are aligned on the same face of the battery, in order to provide for rapid overall examinations of the methods accomplished in the battery. This arrangement is owed particularly to the layout of the mutually aligned mixing cells 8 and of the mutually aligned settling cells 9 parallel to the support rail, and to the heavy phase 14 and light phase channels 15 fairly long and parallel to the lateral faces 2 and 3 through which the extractors 60 are assembled, so that the inlet and outlet ducts of each of the phases leave the block 1 at positions aligned in the direction perpendicular to the lateral faces 2 and 3 and parallel to the support rail 61; whereas a conventional layout of extractors of a battery is top-to-tail, with mixing and settling cells alternating along two parallel lines, which makes possible liquid phase outlet ducts that are shorter and almost perpendicular to the lateral faces (as are also here the inlet ducts 10 and 11), but therefore with the disadvantage that the overall examination of the settling of the stages is no longer possible.

Figure 10:
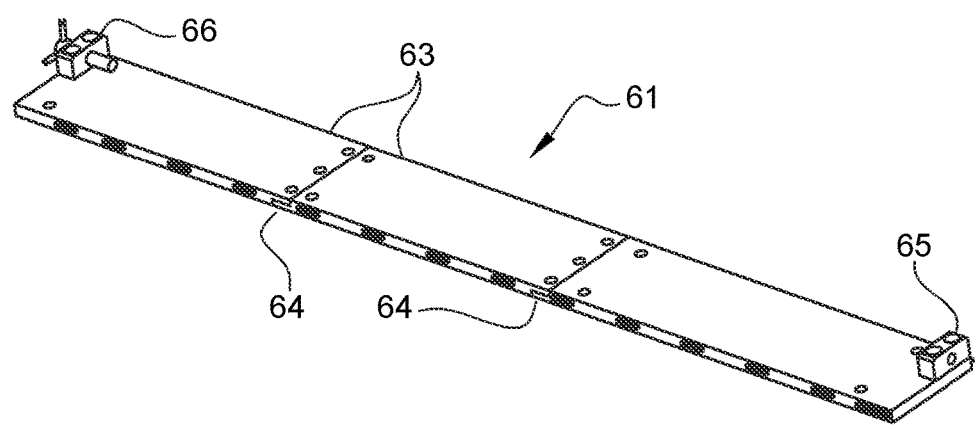
FIG. 10 a rail for mounting and supporting the battery.

FIG. 10 shows that the support rail 61 may consist of any number of individual plates 63 assembled with one another by screwing and interlocking of shape at their junction 64. The ends of the support rail bear opposite stops 65 and 66, one of which at least (66) may comprise a capstan for tightening the battery, avoiding the separations of its elements and ensuring the sealing of the channels 10 to 13. Apart from the extractors 60, the battery comprises, at its ends and therefore in contact with the stops 65 and 66, two end modules 67 and 68 also parallelepiped and comprising inlet and outlet connections, globally referenced by 69, of the phases leading to the rest of their circulation circuits. The end modules 67 and 68 communicate with the inlet and outlet ducts of the adjacent extractor 60. The cohesion of the battery is also ensured by portions of slides and of lugs 70 (shown in FIG. 2) for sliding the extractors 60 on the support rail 61, but without being able to raise them. A similar system is provided on the end modules 67 and 68. In addition, the battery is completed by (FIG. 11) dividing plates 71 between the extractors 60, which are equipped with two holes 72 and 73 supporting seals 74 and 75. The dividing plates 71 are equipped with a lower groove 76 that adjusts on the support rail 61 and makes it possible to hold them in position on it. When the tightening is carried out, the inlet and outlet ducts 10 to 13 of the extractors 60 come in extension with one another, with the holes 72 and 73 between them and the seals 74 and 75 around them, which guarantees the sealing of the liquid circuits.

Finally, attention will be paid to the possibility of regulating the temperature of the liquid phases. It may be accomplished by the circulation of a coolant through the extractors 60. One embodiment, shown in FIG. 12, may comprise, in a block 77 a little more voluminous than the block 1 described thus far, coolant ducts comprising a coolant inlet duct 78 located near the rear face 5, an outlet duct 79 of the coolant also located near the rear face 5, and, connecting the inlet and outlet ducts 78 and 79, an inner duct successively comprising a first descending portion 80, a longitudinal portion 81 near the lower face 6 and directed towards the front face 4, a second longitudinal portion 82 that brings the fluid back towards the rear face 5, parallel and in the opposite direction to the first longitudinal portion 81, and an ascending portion 83. The longitudinal portions 81 and 82 are separated by a partition 84. They make the coolant pass below the mixing cells 8 and settling cells 9.

Figure 13:
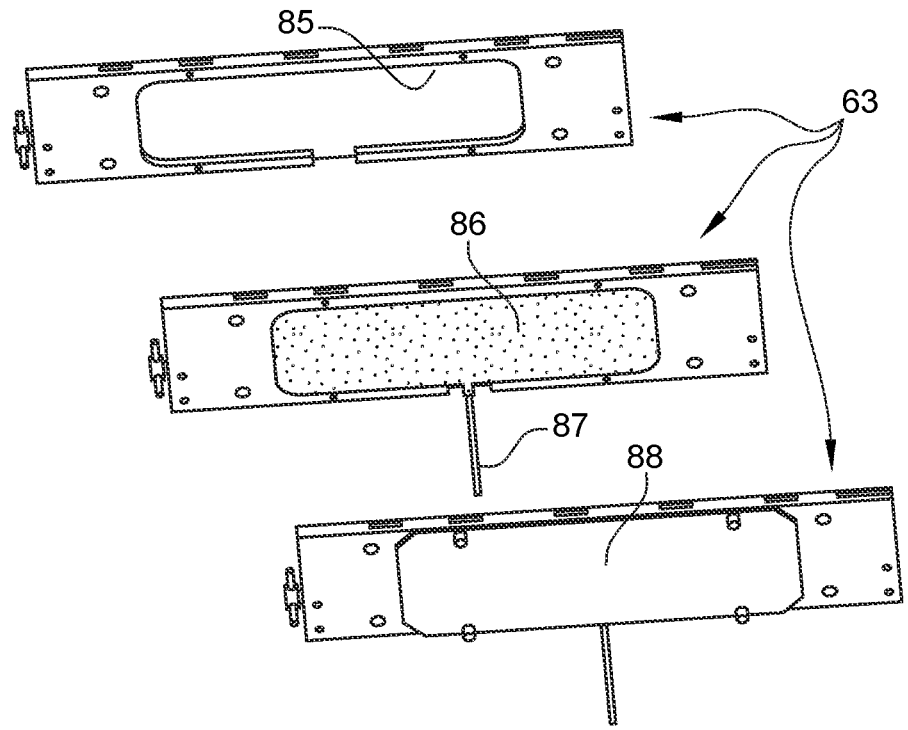
FIG. 13 an embodiment of rail for supporting the battery with integrated heating means.

Another possibility is mentioned regarding FIG. 13. The temperature regulation may be carried out by each plate 63 of the support rail 61, which is equipped with a hollow 85, opening for example at its lower face, and that is filled by a flat electric heater mat 86, supplied by connections to the outside 87. A cover 88 is screwed to close the hollow 85 and hold therein the heater mat 86.

The invention claimed is:

1. Liquid-liquid extractor comprising a block hollowed with a mixing cell and a settling cell in communication, inlet ducts of two liquid phases leading to the mixing cell from opposite lateral faces of the block and outlet ducts of the two liquid phases leading from the settling cell to the opposite lateral faces of the block, wherein openings of the inlet and outlet ducts of one phase on the opposite lateral faces are in alignment in a direction perpendicular to the opposite lateral faces, and openings of the inlet and outlet ducts of the other phase are likewise in alignment in this direction, wherein the outlet ducts are equipped with overflows adjacent to the settling cell, and each provided with an overflow edge of the liquid phases having an irregular height in the form of a broken line delimiting a plurality of reliefs, further comprising settling equipment that can be plugged into the settling cell by translation and comprising a drawdown plate plunging into the settling cell and continuous up to a guard distance with a bottom of the settling cell.

2. Liquid-liquid extractor according to claim 1, wherein the overflow edge of one at least of the overflows consists of a plurality of indentations narrowing downwardly up to a zero width and formed by two oblique edges.

3. Liquid-liquid extractor according to claim 1, wherein the overflow edge of at least one of the overflows is serrated, consisting of identical and uniformly distributed reliefs.

4. Liquid-liquid extractor according to claim 1, wherein one of the overflows is placed at a junction between the settling cell and the outlet duct of one of said liquid phases known as light phase.

5. Liquid-liquid extractor according to claim 1, wherein another of the overflows is placed in an inlet well of the outlet duct of another of the liquid phases known as heavy phase, at an adjustable height in the inlet well.

6. Liquid-liquid extractor according to claim 1, wherein the outlet ducts include channels open at an upper face of the block.

7. Liquid-liquid extractor according to claim 6, wherein the channels extend parallel to the opposite lateral faces of the block, where the outlet ducts open, over at least half of a length of the block, measured parallel to the opposite lateral faces, the inlet and outlet ducts of the heavy phase issuing from the block at locations aligned according to a first line perpendicular to the opposite lateral faces, and the inlet and outlet ducts of the light phase issuing from the block at locations aligned according to a second line perpendicular to the opposite lateral faces.

8. Liquid-liquid extractor according to claim 7, wherein the channels each have a width equal to at least one third of a width, measured perpendicular to the opposite lateral faces, of the settling cell.

9. Liquid-liquid extractor according to claim 1, further comprising a third overflow between the mixing cell and the settling cell, provided with an overflow edge of the liquid phases having an irregular height in the form of a broken line delimiting a plurality of reliefs.

10. Liquid-liquid extractor according to claim 1, wherein the settling equipment comprises a coalescence grid, plunging into the settling cell.

11. Liquid-liquid extractor according to claim 10, wherein the equipment comprises a second coalescence grid, the coalescence grids having opposite wettability properties with regard to one of the liquid phases.

12. Liquid-liquid extractor according to claim 1, wherein the block includes a console on an upper face of which a recirculation pump may be installed, the recirculation pump being provided with vertical suction and discharge tubes respectively plunging into the outlet duct of one of the liquid phases and into a recycling well, hollowed into the block and communicating with the mixing cell.

13. Liquid-liquid extraction battery comprising at least one liquid-liquid extractor according to claim 1, wherein the at least one extractor and end modules are aligned and tightened on a support, the end modules comprising connections to circuits of the countercurrent liquid phases in the battery, the inlets and the outlets of each of the phases being in extension between the extractors.

14. Liquid-liquid extraction battery according to claim 13, further comprising dividing plates tightened against the extractors and supporting seals surrounding the inlet and outlet openings of the liquid phases.

15. Liquid-liquid extraction battery according to claim 13, wherein the liquid-liquid extractors, the end modules, and optionally the dividing plates are interlocked on a rail constituting the support by being able to slide along the rail.

16. Liquid-liquid extraction battery according to claim 13, wherein the support contains a heater mat.

17. Liquid-liquid extraction battery according to claim 13, further comprising a device for circulating coolant passing through the block of the at least one liquid-liquid extractor.

18. Liquid-liquid extraction battery according to claim 15, wherein, for each of the extractors, the channels extend parallel to the opposite lateral faces of the block, where the outlet ducts open, over at least half of a length of the block, measured parallel to the opposite lateral faces, the inlet and outlet ducts of the heavy phase issue from the block at locations aligned according to a first line perpendicular to the opposite lateral faces, and the inlet and outlet ducts of the light phase issue from the block at locations aligned according to a second line perpendicular to the opposite lateral faces, and the extractors are all placed with their homologous constituents aligned according to lines parallel to the rail.

19. Liquid-liquid extraction battery according to claim 18, wherein a portion of the extractors is transparent, the portion delimiting the settling cells.

* * * * *